G. H. WILLIS.
SEPARABLE CORE.
APPLICATION FILED JAN. 17, 1920.
1,348,612.
Patented Aug. 3, 1920.
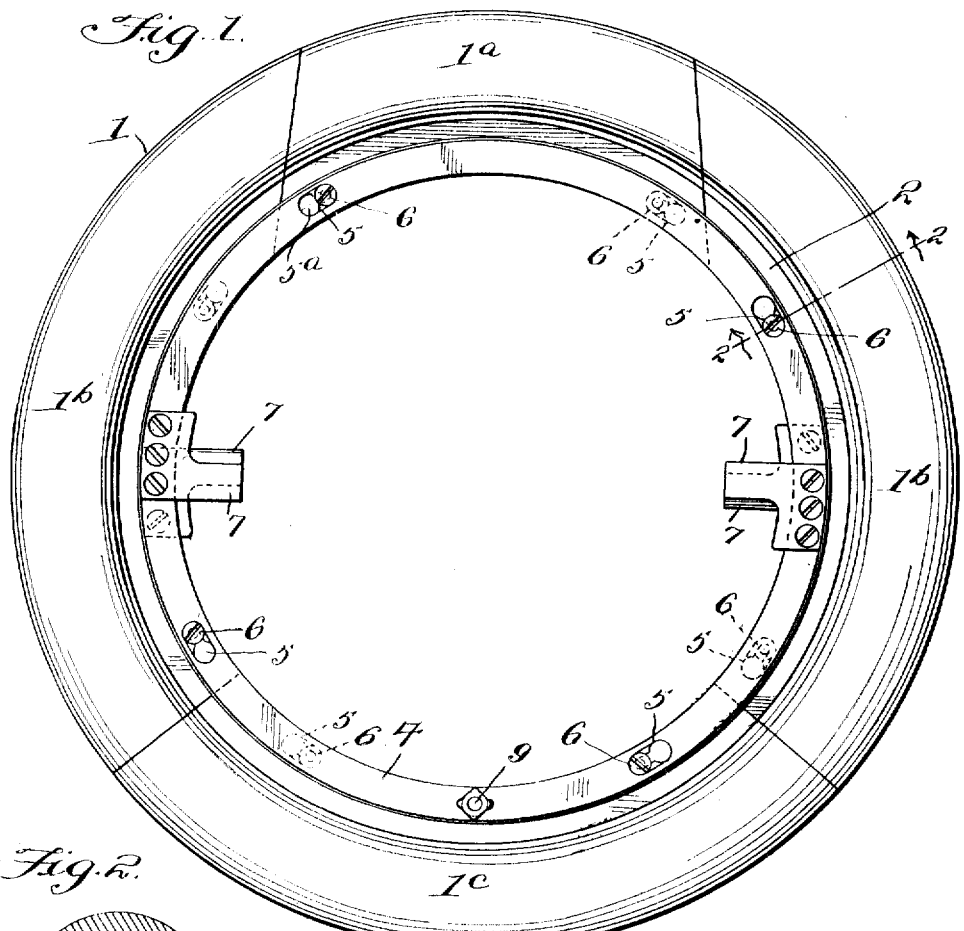
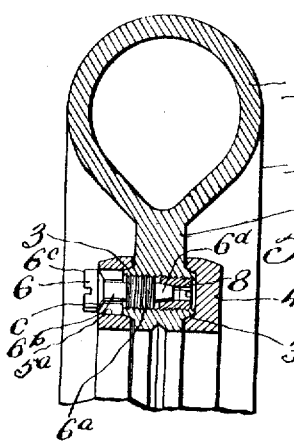
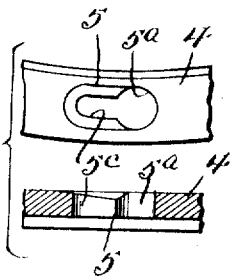
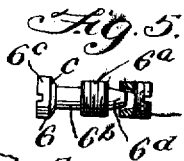
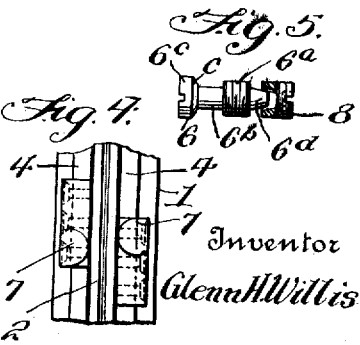
Inventor
Glenn H. Willis
By Spear Middleton Donaldson & Hall
Attorney

UNITED STATES PATENT OFFICE.

GLENN HARLAN WILLIS, OF AKRON, OHIO, ASSIGNOR TO THE MILLER RUBBER COMPANY, OF AKRON, OHIO, A CORPORATION OF OHIO.

SEPARABLE CORE.

1,348,612.     Specification of Letters Patent.     Patented Aug. 3, 1920.

Application filed January 17, 1920. Serial No. 351,985.

*To all whom it may concern:*

Be it known that I, GLENN H. WILLIS, a citizen of the United States, and a resident of Akron, in the county of Summit and State of Ohio, have invented certain new and useful Improvements in Separable Cores, of which the following is a specification.

My present invention relates to improvements in what are known as collapsible or separable cores or mandrels such as are used for manufacturing the outer shoes or casings of pneumatic tires of the double tube type.

The invention aims to provide an extremely simple, economical and efficient type of core which may be easily manipulated to enable the segments to be separately withdrawn from the completed tire casing and in which there will be complete absence, or a minimum number of parts such as nuts or bolts which are removed in the separation of the core, and hence liable to be lost or misplaced, one bolt and nut at most being used.

The invention further aims to provide a construction which, while capable of manipulation as aforesaid, will in the assembled condition of the segments hold the same firmly in accurate alinement under the stresses due to the winding of the tire fabric on the core and its manipulation in the vulcanizers, thereby insuring perfection in the finished tire.

With these and other objects in view, the invention includes the novel features of construction and arrangement and combination of parts hereinafter described and particularly defined by the appended claims.

An embodiment of my invention is illustrated in the accompanying drawing, in which:

Figure 1 is a side elevation of a core or mandrel constructed according to my invention;

Fig. 2 is a transverse section on line 2—2 of Fig. 1; and

Figs. 3, 4 and 5 are views of details.

Referring by reference characters to this drawing, the numeral 1 indicates a core or mandrel which is of annular or ring-shaped form and is composed of a plurality of segments. In the form shown in the drawing, I have shown the mandrel as composed of four segments as a convenient number, one of these members $1^a$ which constitutes the key piece being of tapered or wedge-shaped formation which enables it to be drawn inwardly and removed to unlock the remaining sections which may be thereafter removed from the tire piece by piece, as well understood by those skilled in the art. The lines of division between the side sections $1^b$ and the remaining opposite section $1^c$ may be on radial lines, as shown.

The core has a shape when viewed in cross-section, as shown in Fig. 2, which corresponds to the interior of the finished tire and it is provided with an inwardly extending flange or web 2. This web is provided upon its opposite faces with annular ribs or flanges 3, the walls of which are tapered or inclined as shown. For holding the core sections in alinement and abutting engagement, I provide a pair of rings 4 which are duplicates of each other and which are provided with wedge-shaped recesses adapted to receive the wedge-shaped or tapered ribs 3 as clearly shown in Fig. 2.

With the rings clamped in position as shown in Figs. 1 and 2, it will be seen that the core sections are firmly held in alinement and abutting engagement. To thus hold them in position in a manner to enable them to be readily removed, I provide each ring with a plurality of openings 5 through which pass screw bolts 6 which have threaded portions $6^a$ engaging the correspondingly threaded portions in the flange or web 2 of the core section. Each bolt has a reduced or neck portion $6^b$ between the threaded portion $6^a$ and the head $6^c$, and each opening 5 in the ring has a circular portion $5^a$ of a size corresponding to the bolt heads $6^c$, enabling the bolt head to pass through the opening, and a contracted portion $5^c$ which corresponds in diameter to the reduced portion or neck $6^b$ of the bolt. The bolts holding the ring on one side are arranged in staggered relation to those retaining the ring on the other side as shown by full and dotted lines in Fig. 1. By reason of the arrangement above described, it will be seen that it is not necessary to take out the bolts in order to enable the locking rings to be removed as a circumferential movement of a locking ring will cause the enlarged portions $5^a$ of the openings 5 to aline with the bolt heads thereby enabling the locking or clamping rings to be removed. To enable this circumferential movement to be easily secured, I provide the locking rings with projections or lugs 7 which for facility in manufacture, are preferably made in the shape of independent members secured to the respective rings by rivets or screws, but which might also be made integral therewith, these lugs 7 being so disposed in relation to each other that when a suitable bar or prying tool is inserted therebetween and given a rocking motion, the two lugs are forced in opposite directions and the rings given a corresponding circumferential movement. It will be understood, of course, that owing to the rings being oppositely placed on the opposed sides of the core, the bolt-engaging openings will be in reversely disposed positions so that the movement of the rings in opposite directions will bring them simultaneously into unlocking position. By using two sets of lugs 7 two bars may be used at the same time when desired.

The undercut faces of the bolt heads are preferably tapered or inclined as indicated at $c$ and the contracted portions $5^b$ of the openings in the rings are also tapered or flared at their outer edges to correspond to the bolt heads and are also inclined circumferentially so as to wedge beneath the bolt heads when the rings are turned in one direction and thus cause the rings to be forced toward each other, gripping the web between them, the wedging action secured by the annular ribs 3 on the web 2 and the correspondingly tapered grooves in the rings drawing the sections into accurate alinement and abutting engagement.

The bolts are provided beyond the threaded portions $6^a$ with tapered portions $6^d$ which fit correspondingly tapered openings or recesses in threaded bushings 8 which are screwed into the threaded openings in the web 2 from the opposite side from that in which the bolts are screwed. The engagement of the tapered portions $6^d$ with the tapered openings in the bushings forms a locking device for locking the bolts in position and also allows for the adjustment of the bolt to take up wear on the inclined faces of the ring slots. It will be understood that such adjustment remains fixed during the breaking down or building up of the core.

If desired, a locking bolt 9 may be passed through 1 of the sections (for example, $1^c$) and the rings to avoid any liability of the rings slipping and releasing the core section.

Having thus described my invention, what I claim is:

1. A device of the character described comprising a plurality of arc-shaped sections adapted to abut against each other to form a separable core or mandrel, a locking ring adapted to overlie the inner portions of said sections, and headed members carried by said inner portions, said ring having elongated openings providing enlarged portions to receive said headed members and narrower portions to engage beneath the heads on shifting the ring circumferentially.

2. A device of the character described comprising a plurality of arc-shaped members adapted to abut against each other to form an annular core, a ring adapted to overlie inner portions of said members, said ring having elongated openings provided with relatively wide and narrow portions, and ring holding members adjustably carried by said inner portions and having heads adapted to pass through said wider portions and necks adapted to enter said narrower portions on circumferential shifting of the ring.

3. A device of the character described comprising a plurality of arc-shaped members adapted to abut against each other to form an annular core, a ring adapted to overlie inner portions of said members, said ring having elongated openings provided with relatively wide and narrow portions, and screw bolts threaded into said inner portions and having heads to coöperate with said wider portions and necks fitting said narrower portions.

4. A device of the character described comprising a plurality of arc-shaped members adapted to abut to form a separable core, said members having inwardly projecting portions forming an annular web, said web having threaded openings therethrough, bolts having threaded portions engaging said openings and heads with reduced necks, rings having elongated openings provided with relatively wide and narrow portions to fit said heads and necks, and bushings threaded into said openings against which said bolts bear at their inner ends.

5. A device of the character described comprising a plurality of arc-shaped members adapted to abut to form a separable core, said members having inwardly projecting portions forming an annular web, said web having threaded openings therethrough, bolts having threaded portions engaging said openings and heads with reduced necks, rings having elongated openings provided with relatively wide and narrow portions to fit said heads and necks, and bushings threaded into said openings, said bushings having tapered recesses or openings and said bolts tapered extensions fitting said tapered recesses.

6. A device of the character described comprising a plurality of arc-shaped members adapted to abut to form a separable core, said members having inner portions forming an annular web, holding members located on opposite sides of said web having heads and reduced necks, rings located on opposite sides of said web having openings to receive said heads with reduced extensions to receive said necks, and adjacent projections on said rings adapted to admit a prying instrument therebetween to effect circumferential movement of the rings.

7. A device of the character described comprising a plurality of arc-shaped members adapted to abut to form a separable core, said members having inner portions forming an annular web, holding members located on opposite sides of said web having heads and reduced necks, rings located on opposite sides of said web having openings to receive said heads with reduced extensions to receive said necks, and means for enabling said rings to be shifted circumferentially.

8. A device of the character described comprising a plurality of arc-shaped members adapted to abut against each other to form an annular core, a ring adapted to overlie inner portions of said members, said ring having elongated openings provided with relatively wide and narrow portions, and screw bolts threaded into said inner portions and having heads to coöperate with said wider portions and necks fitting said narrower portions, the heads of said bolts having flared faces and the narrower portions of the openings having flared edges to correspond to the flared faces of the bolt heads.

9. A device of the character described comprising a plurality of arc-shaped sections adapted to abut against each other to form a separable core or mandrel, a locking ring adapted to overlie the inner portions of said sections, and headed members carried by said inner portions, said ring having elongated openings providing enlarged portions to receive said headed members and narrower portions to engage beneath the heads on shifting the ring circumferentially, said head engaging portions of the ring being inclined to the plane of the ring to produce a wedging action.

In testimony whereof, I affix my signature.

GLENN HARLAN WILLIS.